(12) United States Patent
Filson et al.

(10) Patent No.: US 9,347,146 B2
(45) Date of Patent: May 24, 2016

(54) METHOD AND APPARATUS FOR FORMING A LAYERED METAL STRUCTURE WITH AN ANODIZED SURFACE

(71) Applicant: Apple Inc., Cupertino, CA (US)

(72) Inventors: John Benjamin Filson, Mountain View, CA (US); Kenneth J. Silverman, San Jose, CA (US); Masashige Tatebe, Tokyo (JP)

(73) Assignee: Apple Inc., Cupertino, CA (US)

( * ) Notice: Subject to any disclaimer, the term of this patent is extended or adjusted under 35 U.S.C. 154(b) by 151 days.

(21) Appl. No.: 14/157,183

(22) Filed: Jan. 16, 2014

(65) Prior Publication Data

US 2014/0131210 A1 May 15, 2014

Related U.S. Application Data

(60) Continuation of application No. 13/723,077, filed on Dec. 20, 2012, now Pat. No. 8,667,661, which is a division of application No. 12/358,647, filed on Jan. 23, 2009, now abandoned.

(60) Provisional application No. 61/140,827, filed on Dec. 24, 2008.

(51) Int. Cl.
| | |
|---|---|
| *C25D 11/02* | (2006.01) |
| *B32B 15/01* | (2006.01) |
| *C25D 5/02* | (2006.01) |
| *C25D 11/04* | (2006.01) |
| *C25D 7/04* | (2006.01) |
| *C25D 11/26* | (2006.01) |

(52) U.S. Cl.
CPC ............ *C25D 11/022* (2013.01); *B32B 15/012* (2013.01); *B32B 15/013* (2013.01); *C25D 5/022* (2013.01); *C25D 7/04* (2013.01); *C25D 11/04* (2013.01); *C25D 11/26* (2013.01); *Y10T 29/302* (2015.01); *Y10T 29/49888* (2015.01); *Y10T 428/12757* (2015.01)

(58) Field of Classification Search
CPC ...... C25D 11/022; C25D 11/26; C25D 11/04; C25D 7/04; C25D 5/022; B32B 15/013; B32B 15/012; Y10T 29/49888; Y10T 29/302; Y10T 428/12757
See application file for complete search history.

(56) References Cited

U.S. PATENT DOCUMENTS

| | | | | | |
|---|---|---|---|---|---|
| 3,202,588 | A | * | 8/1965 | Fromson | B44C 1/222 205/121 |
| 3,240,685 | A | * | 3/1966 | Maissel | H01C 17/262 204/224 R |
| 3,919,763 | A | * | 11/1975 | Ulam | A47J 27/002 219/121.14 |
| 4,526,103 | A | * | 7/1985 | Kubota | B32B 15/012 101/458 |
| 4,546,051 | A | * | 10/1985 | Uchida | C23C 2/12 148/505 |
| 4,655,852 | A | * | 4/1987 | Rallis | C23C 2/12 148/518 |

(Continued)

*Primary Examiner* — Jason L Vaughan
(74) *Attorney, Agent, or Firm* — Downey Brand LLP (57) ABSTRACT

Methods and apparatus for forming a multi-layered metal structure that includes an anodized surface are disclosed. According to one aspect, a housing arrangement can include a stainless steel layer and at least a first layer. The first layer can have a first bonding surface and a first exterior surface. The first bonding surface can be substantially bonded in direct contact with the stainless steel layer, and the first exterior surface can be an exterior of the housing arrangement. The first exterior surface is an anodized surface. In one embodiment, the first layer can be formed from an anodizable material such as aluminum, titanium, niobium, or tantalum.

19 Claims, 9 Drawing Sheets

(56) References Cited

U.S. PATENT DOCUMENTS

| | | | | |
|---|---|---|---|---|
| 5,049,206 A * | 9/1991 | Usui | ............... | B01D 53/86<br>148/518 |
| 5,151,946 A * | 9/1992 | Martensson | ............ | H04M 1/03<br>379/433.06 |
| 6,360,423 B1 * | 3/2002 | Groll | ............... | A47J 36/02<br>220/573.1 |
| 6,996,425 B2 * | 2/2006 | Watanabe | ............ | H04M 1/18<br>379/433.01 |
| 7,168,148 B2 * | 1/2007 | Groll | ............... | A47J 27/002<br>220/573.1 |
| 7,684,178 B2 * | 3/2010 | Hsu | ............... | B29C 45/14811<br>361/679.21 |
| 8,023,261 B2 * | 9/2011 | Sanford | ............ | H05K 5/0013<br>361/679.55 |
| 8,090,417 B2 * | 1/2012 | Liang | ............... | G06F 1/1626<br>455/575.1 |
| 8,153,270 B2 * | 4/2012 | Akieda | ............... | B32B 27/36<br>428/172 |
| 2007/0275263 A1 * | 11/2007 | Groll | ............... | A47J 36/02<br>428/653 |
| 2008/0311965 A1 * | 12/2008 | Gao | ............... | H04B 1/3838<br>455/575.1 |

\* cited by examiner

METHOD AND APPARATUS FOR FORMING A LAYERED METAL STRUCTURE WITH AN ANODIZED SURFACE

CROSS-REFERENCE TO RELATED APPLICATIONS

This a is a continuation of and claims priority under 35 U.S.C. §120 to U.S. application Ser. No. 13/723,077 filed Dec. 20, 2012 entitled "Method And Apparatus For Forming A Layered Metal Structure With An Anodized Surface," which is a divisional of U.S. application Ser. No. 12/358,647, filed Jan. 23, 2009, entitled "Method And Apparatus For Forming A Layered Metal Structure With An Anodized Surface", which claims priority under 35 U.S.C. §119(e) to U.S. Provisional Application Ser. No. 61/140,827, filed Dec. 24, 2008, entitled "Compact Device Housing And Assembly Techniques Therefor," which are hereby incorporated herein by reference in their entirety.

FIELD

The present invention relates to the formation of housings for use in electronic devices and, more particularly, to forming cosmetic surfaces on stainless steel housing parts.

BACKGROUND

Many devices, e.g., portable electronic devices such as cell phones and media players, include housing walls formed from structurally strong and stiff materials such as stainless steel. The strength provided by materials such a stainless steel enables housing walls to protect internal components of portable electronic devices, and enhances the durability of such devices.

In some applications, while stainless steel provides desirable strength characteristics for housing walls, the stainless steel may not provide acceptable cosmetic characteristics. For example, a stainless steel surface is often relatively easy to scratch, and a scratched stainless steel surface may be unappealing. Although anodizing processes may be used on some metals in order to effectively provide a scratch-resistant surface, stainless steel may not be anodized, as rust forms on stainless steel due to oxidation. Hence, for applications in which cosmetic appeal is a relatively important feature, the use of stainless steel may be undesirable.

Metals such as aluminum may be anodized to prevent scratching. That is, the surface of some metals, such as aluminum, may be anodized such that the surface becomes substantially scratch-resistant. However, aluminum is relatively weak structurally. Hence, while an aluminum surface may be anodized to protect the surface from being scratched, the use of aluminum as a housing may be undesirable due to the lack of structural strength associated with aluminum.

Therefore, what is needed is a method and an apparatus which enables a relatively strong, cosmetically-appealing housing wall to be created.

SUMMARY

The present invention pertains to creating a housing structure, such as a housing wall, that includes a stainless steel core and one or more anodized, cosmetic outer surfaces. The present invention may be implemented in numerous ways, including, but not limited to, as a method, system, device, or apparatus. Example embodiments of the present invention are discussed below.

According to one embodiment of the present invention, a housing arrangement can include a stainless steel layer and at least a first layer. The first layer can have a first bonding surface and a first exterior surface. The first bonding surface can be substantially bonded in direct contact with the stainless steel layer, and the first exterior surface can be an exterior of the housing arrangement. The first exterior surface can be an anodized surface. In one embodiment, the first layer is formed from an anodizable material such as aluminum, titanium, niobium, or tantalum.

According to another embodiment of the present invention, a method for forming a housing arrangement can include directly bonding at least a first laminant layer to a stainless steel layer, and masking at least one surface of the stainless steel layer that is not directly bonded to the first laminant layer. Masking the surface of the stainless steel layer includes applying a mask to the surface of the stainless steel layer. The method can also include anodizing the first laminant layer such that the surface of the stainless steel that is masked is not anodized. Anodizing the first laminant layer causes a surface of the first laminant layer to be anodized. The mask is removed from the surface of the stainless steel layer after the first laminant layer is anodized. In one embodiment, directly bonding the first laminant layer to the stainless steel layer includes cladding the first laminant layer to the stainless steel layer.

In accordance with still another embodiment of the present invention, a housing wall that is suitable for use in a portable electronic device can include a first aluminum layer, a second aluminum layer, and a stainless steel layer. The first aluminum layer can include a first cladding surface and a first outer surface, and the second aluminum layer can include a second cladding surface and a second outer surface. The stainless steel layer is disposed between the first aluminum layer and the second aluminum layer. The first aluminum surface and the second aluminum layer are clad to the stainless steel layer such that the first cladding surface and the second cladding surface are in contact with the stainless steel layer. The first outer surface and the second outer surface are at least partially anodized.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, in which.

DETAILED DESCRIPTION

Example embodiments of the present invention are discussed below with reference to the various figures. However, those skilled in the art will readily appreciate that the detailed description given herein with respect to these figures is for explanatory purposes, as the invention extends beyond these embodiments.

The strength associated with stainless steel is generally desirable in the formation of housing walls for portable electronic devices including, but not limited to including, mobile phones (e.g., cell phones), portable digital assistants and digital media players. The stiffness associated with stainless steel is also desirable. However, the cosmetic properties of stainless steel are often lacking. To provide a cosmetic surface for a housing that effectively derives its strength from a stainless steel layer, an anodizable material may be clad to at least one surface of the stainless steel layer and then anodized. In one embodiment, a housing may include a stainless steel core that is substantially sandwiched between two layers of anodized material, e.g., anodized aluminum, which have a relatively high bond strength. The layers of anodized material effectively form cosmetic surfaces for the housing, while the stainless steel core provides structural strength, as well as stiffness, for the housing.

Figure 1:
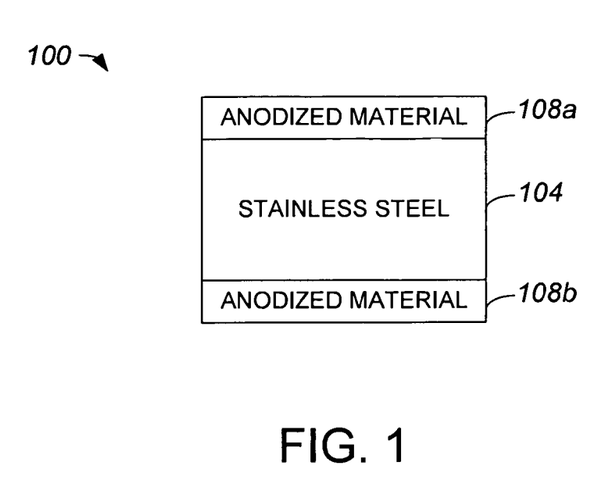
FIG. 1 is a block diagram representation of a structure which includes a stainless steel layer on which layers of anodized material are provided in accordance with an embodiment of the present invention.

Referring initially to FIG. 1, a structure 100 which includes a stainless steel layer that is sandwiched between layers of anodized material will be described in accordance with an embodiment of the present invention. The structure 100, which may be a wall that is a part of a housing for a portable electronic device, includes a layer of stainless steel 104. Layer of stainless steel 104, which is effectively a core, has layers of anodized material 108a, 108b laminated thereon. In general, layer of stainless steel 104 and layers of anodized material 108a, 108b are bonded such that structure 100 is effectively a three-layer metal sandwiched arrangement.

Figure 2:
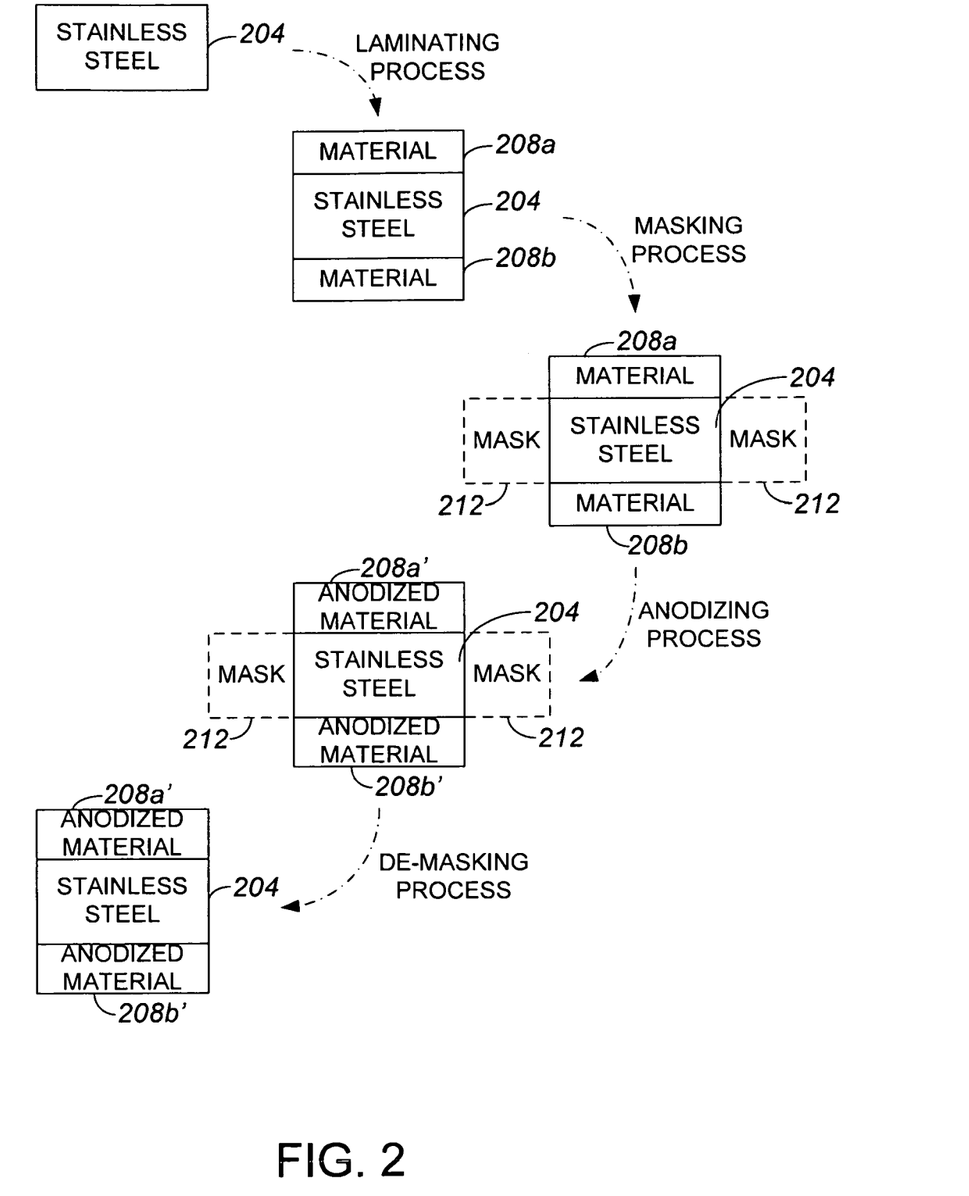
FIG. 2 is a diagrammatic representation of a general process of forming a structure which includes a plurality of anodized layers in accordance with an embodiment of the present invention.

A structure such as structure 100 which includes a stainless steel layer and at least one anodized metal layer may be formed such that an anodizing process occurs after the stainless steel layer is bonded to an anodizable, but still substantially unanodized, metal layer. FIG. 2 is a diagrammatic representation of a general process of forming a structure which includes a plurality of anodized layers in accordance with an embodiment of the present invention. A stainless steel layer 204 is subjected to a laminating process which allows layers of material 208a, 208b to be laminated onto stainless steel layer 204. The laminating process typically bonds material 208a, 208b substantially directly to stainless steel layer 204.

Layers of material 208a, 208b are generally formed from anodizable metals, i.e., metals which may be anodized. In one embodiment, layers of material 208a, 208b may be aluminum, titanium, niobium, or tantalum layers.

A laminating process may be substantially any process which allows layers of material 208a, 208b to be bonded to stainless steel layer 204 without the use of an intermediate bonding agent. That is, a laminating process may be arranged to allow layers of material 208a, 208b to be bonded directly to stainless steel layer 204. A laminating process may, for example, be a cladding process. As will be understood by those skilled in the art, a cladding is the bonding of metals substantially without an intermediate bonding agent and substantially without remelting the metals. Cladding may take a variety of different forms including, but not limited to including, standard cladding in which layers of material 208a, 208b and stainless steel layer 204 are pressed together with roller under high pressure, or fine cladding in which layers of material 208a, 208b and stainless steel layer 204 are placed in a vacuum and rolled together after a chemical process is performed.

A masking process is used, after layers of material 208a, 208b are laminated onto stainless steel layer 204, to apply masks 212 to cover substantially all exposed areas of stainless steel layer 204. The exposed areas are generally areas of stainless steel 204 which are not in contact with layers of material 208a, 208b. Masks 212 serves to prevent areas of stainless steel layer 204 from oxidizing during an anodizing process arranged to anodize layers of material 208a, 208b to form layers of anodized material 208a', 208b'. After an anodizing process is completed and layers of anodized material 208a', 208b' are formed, masks 212 may be removed using a de-masking process.

Figure 3:
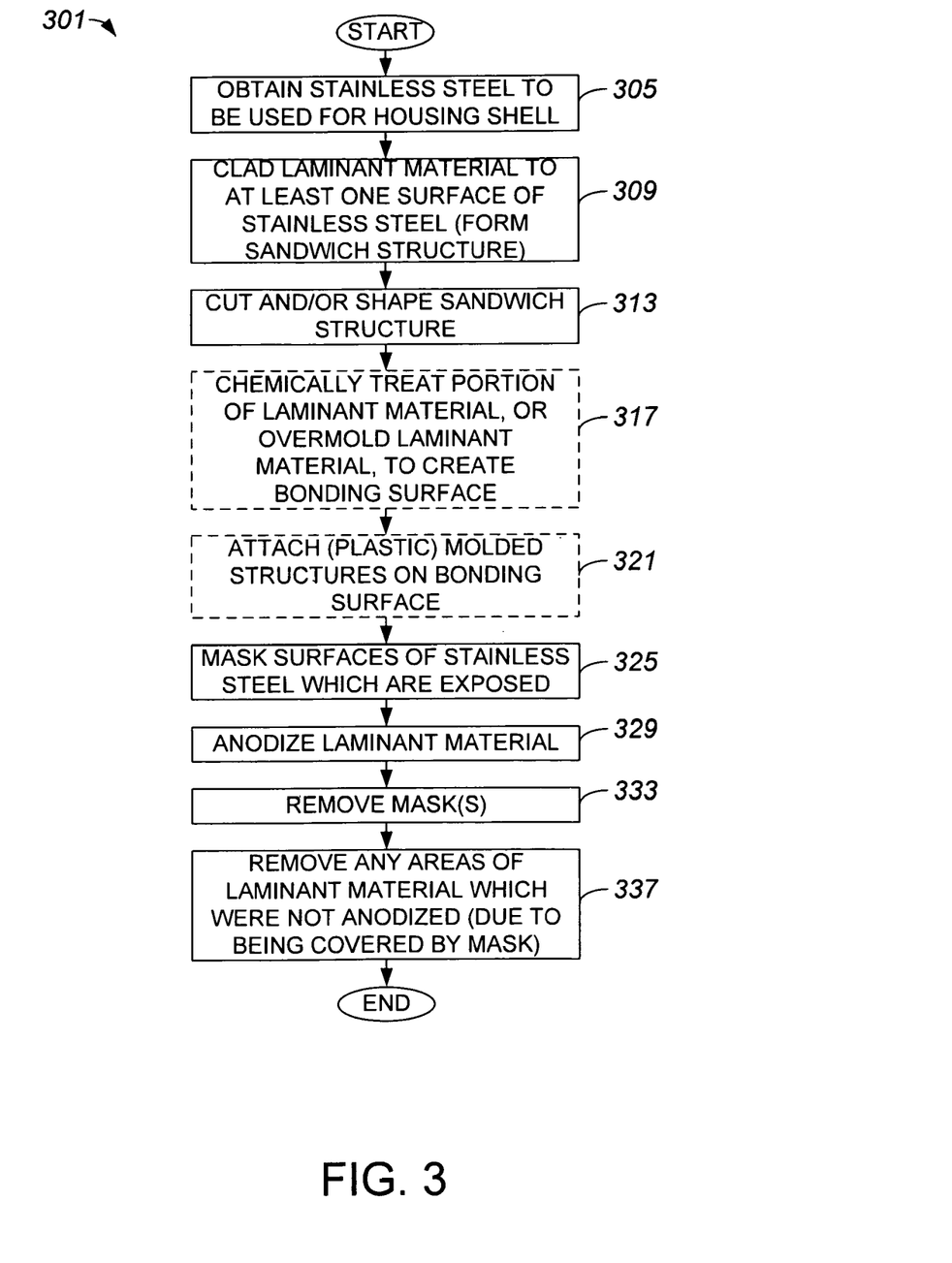
FIG. 3 is a process flow diagram which illustrates a method of forming an overall housing that includes a stainless steel layer and at least one anodized layer in accordance with an embodiment of the present invention.

With reference to FIG. 3, a process 301 of forming an overall housing that includes a stainless steel layer and at least one anodized layer will be described in accordance with an embodiment of the present invention. A process 301 of forming an overall housing begins at step 305 in which stainless steel which is to be used to from a housing shell is obtained. The stainless steel may be in the form of a stainless steel sheet.

After the stainless steel is obtained, a laminant material is clad or otherwise substantially directly bonded to at least one surface of the stainless steel in step 309. By way of example, if the stainless steel is in the form of a stainless steel sheet, a laminant material such as aluminum may be clad to at least one side of the stainless steel sheet. In one embodiment, aluminum such as Al 1100 or Al 5052 may be clad to both sides of a stainless steel sheet to form a sandwich structure or a 3-layer metal arrangement. For ease of discussion, a sandwich structure will be described as being formed when a laminant material is clad or substantially directly bonded to the stainless steel.

Once the sandwich structure is formed, the sandwich structure is cut and/or shaped as appropriate in step 313 to form a housing shell. A draw-forming process may be used with respect to the sandwich structure such that the housing shell is formed. Once a housing shell is formed, a portion of the laminant material may optionally be chemically treated and/or subjected to an overmolding process in step 317 to create a bonding surface. By way of example, a surface of the housing shell which is intended to form an interior surface of an electronic device may be treated and/or overmolded to provide a bonding surface that allows structures (e.g., internal structures) to be attached. The structures may be plastic structures. In one embodiment, the bonding surface may be either a location onto which plastic may be molded, or an attachment point onto which components may be attached, e.g., screwed or otherwise fastened. If a bonding surface is created, then structures may be attached to the bonding surface in optional step 321. It should be appreciated that the molded structures which are attached in optional step 321 are typically able to withstand an anodizing process.

In step 325, the surfaces of stainless steel which are exposed, e.g., not in substantially direct contact with the laminant material, are masked in step 325. A mask is arranged to essentially create a water-tight seal which covers surfaces of the stainless steel, and may generally either be reusable or disposable. A disposable mask is arranged to be used approximately one time. A reusable mask may be formed from a masking material such as silicone rubber or ethylene propylene diene M-class (EPDM) rubber, and may be arranged to be slipped over the exposed surfaces of stainless steel. A disposable mask may be formed from a masking material such as polyvinyl chloride (PVC) or polypropelene (PP), and/or may be arranged to be substantially painted onto or molded onto the exposed surfaces of stainless steel. It should be appreciated that in masking the exposed surface of stainless steel, part of the laminant material may be party covered by or overlapped by a mask.

From step 325, process flow moves to step 329 in which the laminant material is anodized. Any suitable anodizing process may generally be used to anodize the laminant material. For instance, the sandwich structure may be placed in an electrolyte bath as a part of an anodizing process. The anodizing process creates anodized surfaces on the laminant material. The anodized surfaces are created on the laminant material, e.g., aluminum, in the presence of the stainless steel layer. It should be understood, however, that because stainless steel layer is either bonded to the laminant material or masked, substantially only surfaces of laminant material are exposed during an anodizing process.

Once the laminant material is anodized, masks previously positioned over exposed surfaces of stainless steel are removed in step 333. Then, in step 337, any areas of the laminant material which remain unanodized, e.g., because the areas were substantially covered by the mask, are removed. In one embodiment, steps 333 and 337 may be substantially combined into the same step. Methods which may be used to remove the areas of laminant material include, but are not limited to including, shearing methods and cutting methods. The cutting methods can, for example, include water jet cutting methods and laser cutting methods. The process of forming an overall housing may be completed after any laminant material which remains unanodized is removed.

Figure 4:
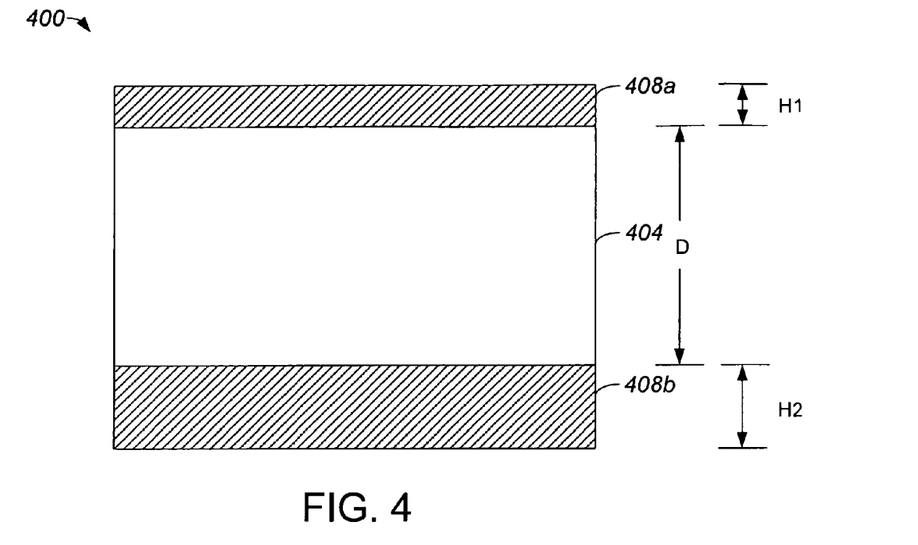
FIG. 4 is a block diagram representation of relative thicknesses associated with a three layer housing in accordance with an embodiment of the present invention.

When a sandwich structure is formed, the thickness of the anodized layers are generally a function of the thickness of a core, e.g., stainless steel, layer. FIG. 4 is a block diagram representation of relative thicknesses associated with a three-layer metal structure, e.g., a housing, in accordance with an embodiment of the present invention. A structure 400 includes a core stainless steel layer 404 sandwiched between layers of anodized material 408a, 408b. Stainless steel layer 404 has a thickness D, while layer of anodized material 408a has a thickness H1 and layer of anodized material 408b has a thickness H2. In the described embodiment, the sum of thickness H1 and thickness H2 is less than or approximately equal to half of thickness D. By way of example, thickness D may be approximately 0.35 millimeters (mm), thickness H1 may be approximately 0.05 mm, and thickness H2 may be approximately 0.10 mm. It should be appreciated, however, that the sum of thickness H1 and thickness H2 is not limited to being less than or approximately equal to half of thickness D. For instance, thickness H1 and thickness H2 may each be in the range of between approximately 8 microns and approximately 100 microns. In one embodiment, thickness H1 and thickness H2 are generally greater than approximately 30 microns if anodized material 408a, 408b is anodized aluminum.

In general, the absolute value of the thicknesses may vary greatly depending on the properties desired in structure 400. The overall thickness of structure 400 may be between approximately 0.30 mm and approximately 2.0 mm, although the overall thickness may generally vary widely. That is, the sum of thickness H1, thickness H2, and thickness D may be between approximately 0.30 mm and approximately 2.0 mm.

Figure 5:
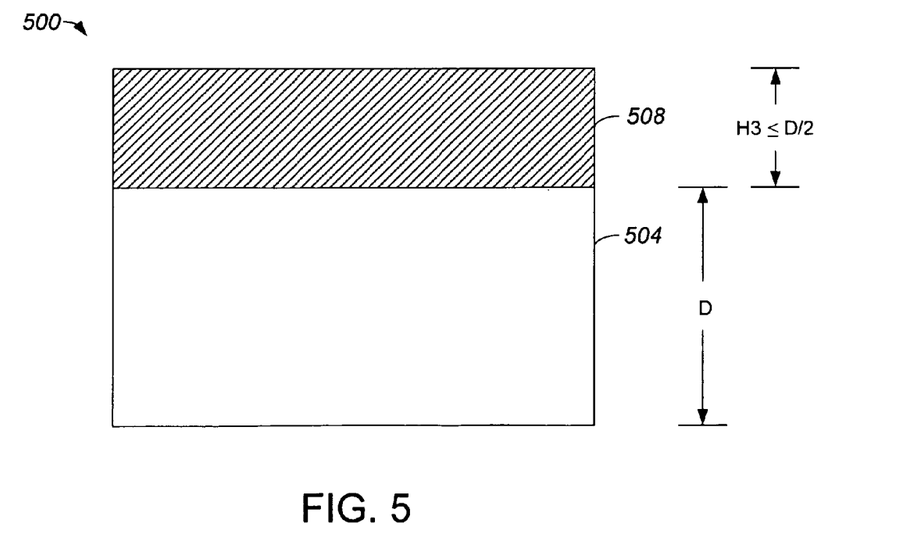
FIG. 5 is a block diagram representation of relative thicknesses associated with a two layer housing in accordance with an embodiment of the present invention.

Referring next to FIG. 5, the relative thicknesses of layers included in a two-layer metal structure, e.g., a housing in which only one surface of stainless steel is covered by a laminant material such as aluminum, will be described in accordance with an embodiment of the present invention. A housing 500 includes a core stainless steel layer 504 and a layer of anodized material 508. Stainless steel layer 504 has a thickness D, and layer of anodized material 508 has a thickness H3. Thickness H3 is typically less than or approximately equal to half of D. It should be appreciated, however, that thickness H3 is not limited to being less than or approximately equal to half of D.

Figure 6A:
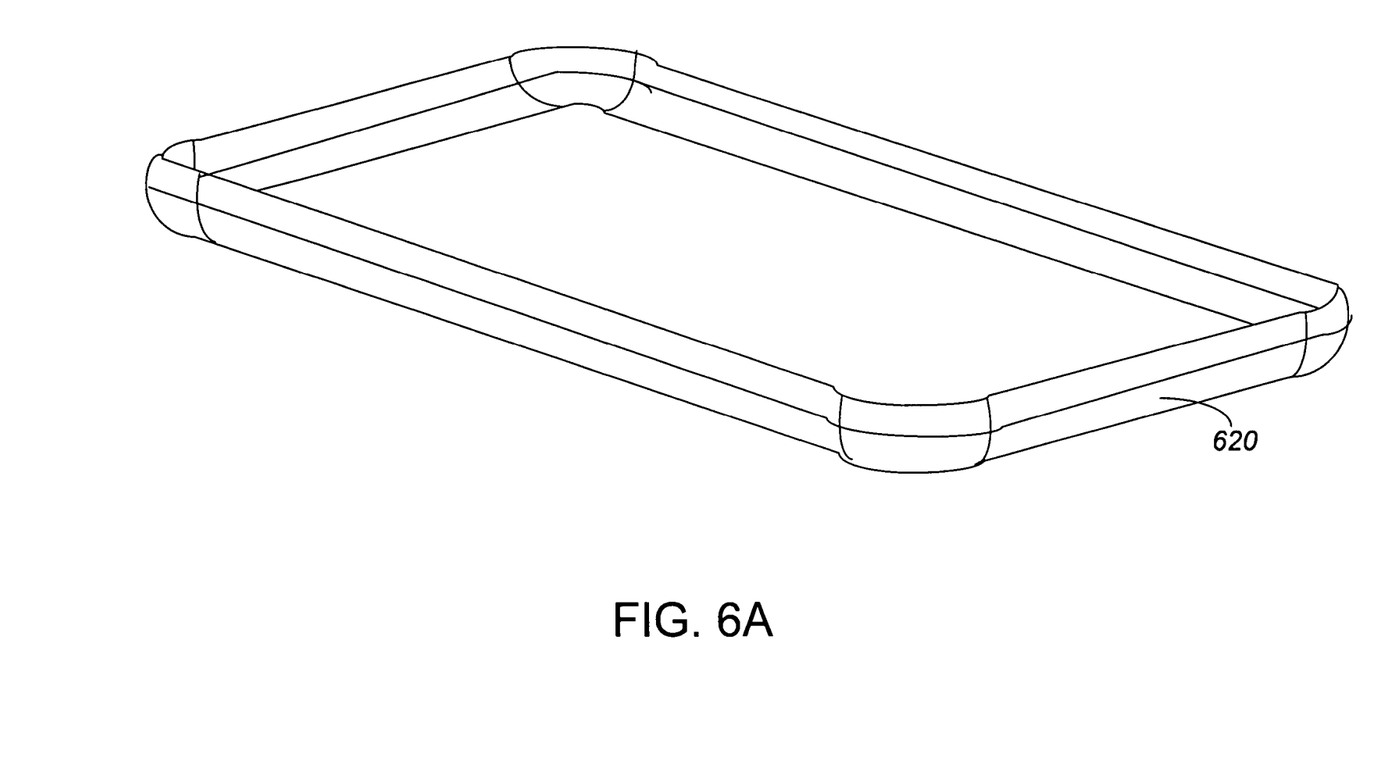
FIG. 6A is a diagrammatic representation of a housing prior to a mask being placed over an exposed stainless steel surface in accordance with an embodiment of the present invention.
Figure 6B:
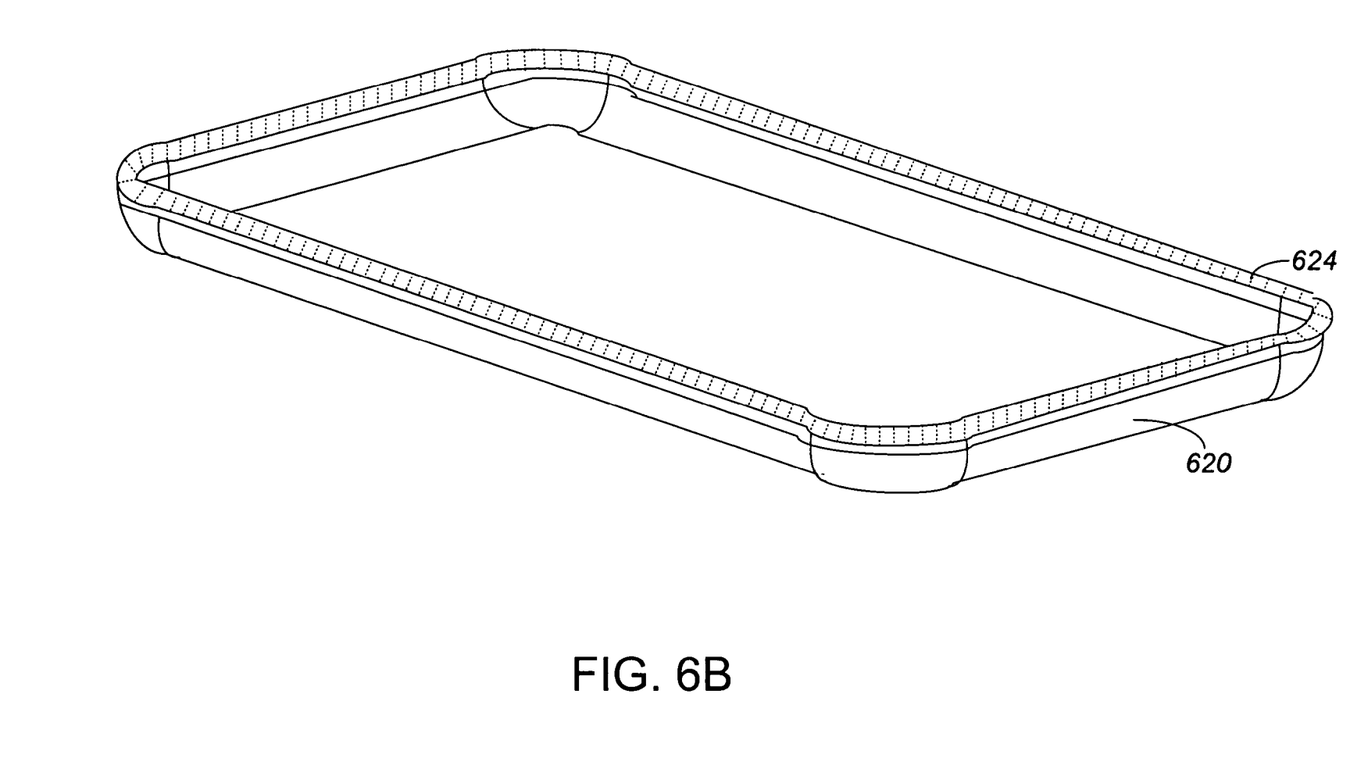
FIG. 6B is a diagrammatic representation of a housing on which a mask has been placed over an exposed stainless steel surface in accordance with an embodiment of the present invention.

As described above, a three-layer or two-layer metal structure may included areas of exposed stainless steel, or areas in which stainless steel is not substantially covered by a laminant material. Such areas are generally masked prior to an anodizing process to protect the areas of exposed stainless steel from oxidizing or rusting. In one embodiment, an edge of a housing formed from a three-layer metal assembly may be masked with a masking material such that substantially only laminant material, as for example aluminum, is exposed. FIG. 6A is a diagrammatic representation of a housing on which a mask is to be placed, and FIG. 6B is a diagrammatic representation of the same housing after a mask has been placed over an exposed stainless steel surface in accordance with an embodiment of the present invention. A housing 620 may be a housing that is to be a part of an overall assembly, as for example a bottom of a cell phone assembly. As shown in FIG. 6B, a mask 624 is applied to a top edge of housing 620.

Figure 7A:
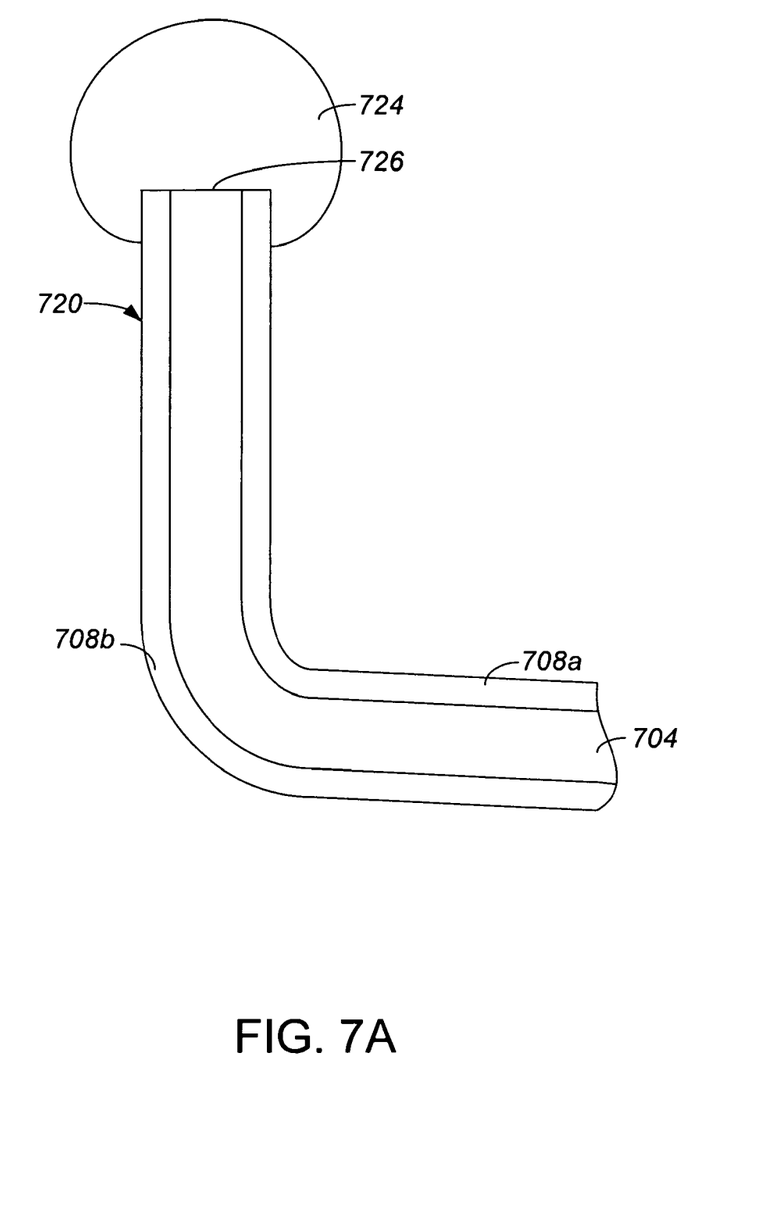
FIG. 7A is a diagrammatic cross-sectional representation of a section of a masked housing in accordance with an embodiment of the present invention.

A mask, such as mask 624, may partially overlap or cover areas of laminant material. FIG. 7A is a diagrammatic cross-sectional representation of a section of a masked housing in which a mask partially overlaps areas of laminant material accordance with an embodiment of the present invention. A housing 720 includes a stainless steel core 704 that is sandwiched between layers of laminant material 708a, 708b. It should be appreciated that layers of laminant material 708a, 708b are generally layers of anodizable material, e.g., aluminum.

A mask 724 is arranged over a surface 726 of stainless steel core 704 which is not in contact with layers of laminant material 708a, 708b. Mask 724 is typically formed from a complaint material which does not react to acid solutions used in an anodizing process, and protects surface 726 from oxidizing during the anodizing process.

Figure 7B:
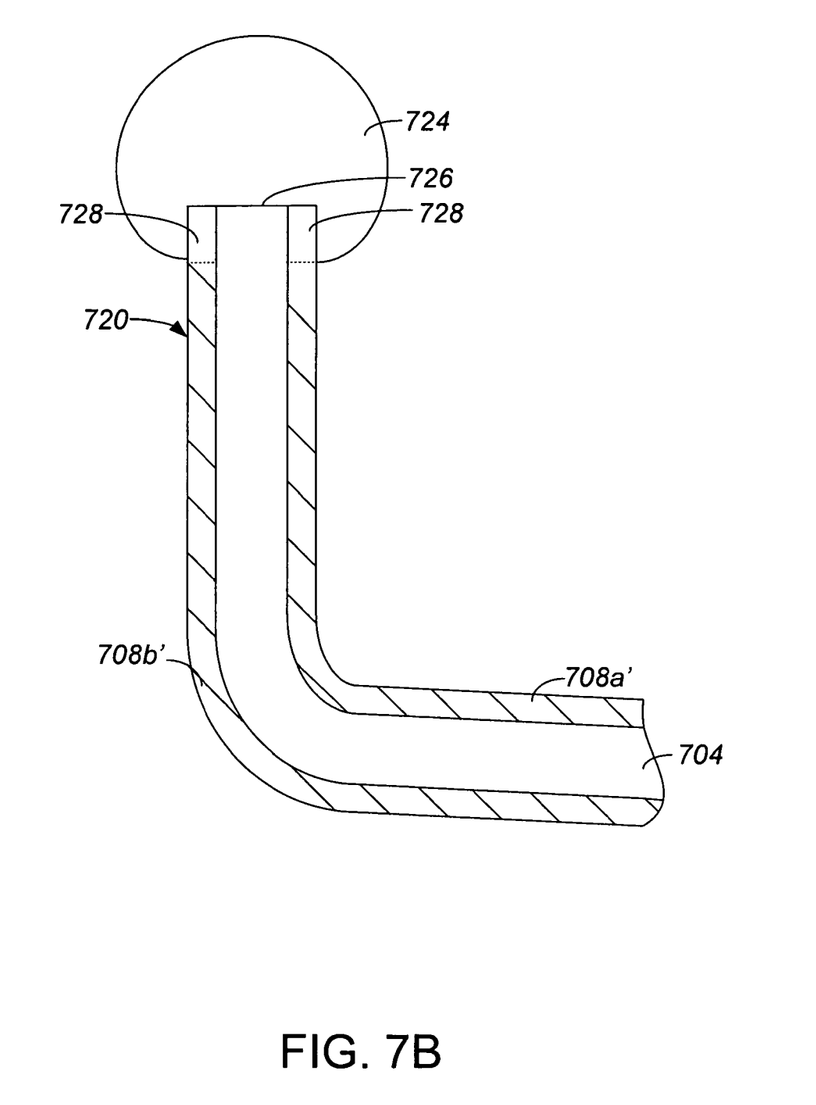
FIG. 7B is a diagrammatic cross-sectional representation of a section of a masked housing after an anodizing process in accordance with an embodiment of the present invention.

Often, the application of mask 724 is such that layers of laminant material 708a, 708b are partly covered by mask 724. As such, the parts of layers of laminant material 708a, 708b which are party covered by mask 724 may be prevented from being anodized during an anodizing process. FIG. 7B is a diagrammatic cross-sectional representation of housing 720 after an anodizing process in accordance with an embodiment of the present invention. After an anodizing process, layers of laminant material 708a, 708b are effectively anodized, with the exception of areas 728 which remain substantially unanodized. Areas 728 are unanodized due to mask 724 overlying areas 728. Mask 724 effectively prevents solutions, as for example acid solutions, used in an anodizing process from coming into contact with areas 728.

In one embodiment, areas 728 may be removed from housing 720 using a shearing or cutting process. Mask 724 may also be removed from housing 720 using the same shearing or cutting process used to remove areas 728.

Figure 8:
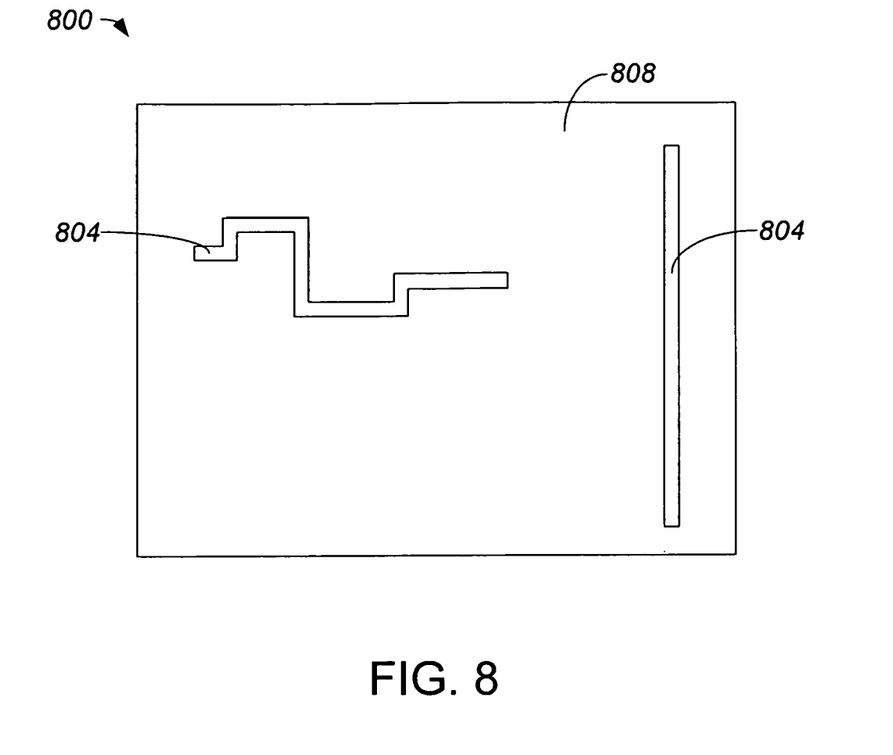
FIG. 8 is a diagrammatic top view representation of a structure that includes an etched anodized layer with an underlying stainless steel layer in accordance with an embodiment of the present invention.

In one embodiment, a layer of anodized metal may be etched such that the underlying stainless steel layer is at least partially exposed. The layer of anodized metal may be machined or etched to expose the stainless steel layer for welding purposes, e.g., when features are to be welded to the stainless steel layer. FIG. 8 is a diagrammatic top view representation of a structure that includes an etched anodized layer with an underlying stainless steel layer in accordance with an embodiment of the present invention. A structure 800 includes a layer of anodized material 808, which may be a layer of anodized aluminum. Areas of layer of anodized material 808 may be etched or otherwise removed such that underlying portions of a stainless steel layer 804 are exposed.

Figure 9:
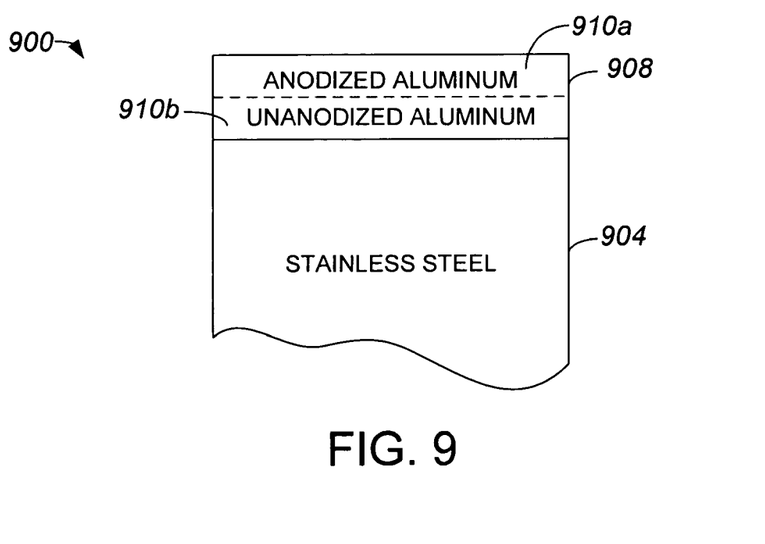
FIG. 9 is a block diagram representation of a layered structure that includes a stainless steel layer and an aluminum layer which includes an anodized aluminum portion in accordance with an embodiment of the present invention.

After an anodizing process is performed on an anodizable material which is bonded, e.g., clad, to stainless steel, portions of the anodizable material may remain unanodized. In other words, a top surface of the anodizable material may be anodized, while other parts of the anodizable material are not anodized. If the anodizable material is aluminum, after an anodizing process, a top surface may be anodized aluminum while underlying areas are unanodized aluminum. FIG. 9 is a block diagram representation of a layered structure that includes a stainless steel layer and an aluminum layer which includes an anodized aluminum portion in accordance with an embodiment of the present invention. A structure 900 includes a stainless steel layer 904 and at least one anodized material layer 908. In the described embodiment, anodized material layer 908 is composed of aluminum. After an anodizing process, anodized material layer 908 is such that it includes anodized aluminum 910a and unanodized aluminum 910b. Typically, anodized aluminum 910a forms a top surface of anodized material layer 908, while unanodized aluminum 910b is bonded to stainless steel layer 904.

Although only a few embodiments of the present invention have been described, it should be understood that the present invention may be embodied in many other specific forms without departing from the spirit or the scope of the present invention. By way of example, while a structure which includes a stainless steel layer and at least one anodized layer has been described as being used for a housing wall, such a structure is not limited to being used as a housing wall. A structure which includes a stainless steel layer and one or more anodized layers bonded therethrough may generally be used in substantially any application in which the strength associated with stainless steel and the cosmetic appeal of an anodized layer are desired.

While laminant layers have been described as being clad to a stainless steel layer, laminant layers are not limited to being clad to a stainless steel layer. In other words, a housing wall is not limited to including a stainless steel layer that provides strength. Instead of including a stainless steel core, for instance, a three-layer metal sandwiched arrangement may include substantially any core to which a laminant layer may be clad or otherwise bonded prior to an anodizing process.

As shown in FIG. 8, an anodized layer may be etched to expose an underlying stainless steel layer. For instance, an anodized aluminum layer may be etched to expose the stainless to which the anodized aluminum layer is clad. It should be appreciated that an anodized aluminum layer may also be etched to expose an unanodized aluminum which underlies the anodized aluminum layer.

The operations associated with the various methods of the present invention may vary widely. Steps may be added, removed, altered, combined, and reordered without departing from the spirit or the scope of the present invention. By way of example, if a mask used to prevent stainless steel from oxidizing during an anodizing process is a disposable mask, the steps of removing a mask and removing areas of laminant material which were not anodized due to being covered by the mask may be combined into a singled step. In other words, a shearing or cutting process used to remove areas of laminant material which were not anodized may also remove a mask that effectively prevented the areas of laminant material from being anodized.

In one embodiment, plastic may effectively be overmolded on a bonding face after that face has been anodized. That is, molded structures may be attached to an anodized bonding surface in some instances. Anodizing may be removed in selected areas, e.g., using laser etching, to form a surface onto which a molded structure may be attached using a process such as a nano molding process.

The many features and advantages of the present invention are apparent from the written description. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A method of anodizing selected portions of a housing of an electronic device, the housing including a multi-layered metal sandwich structure having an anodizable exterior laminate layer bound to a first surface of a non-anodizable layer and an anodizable interior laminate layer bound to a second surface of the non-anodizable layer, the method comprising:
   masking a third surface of the non-anodizable layer and a portion of the anodizable exterior laminate layer and interior laminate layer using a mask configured to prevent exposure of the third surface from a subsequent anodizing process;
   anodizing un-masked portions of the anodizable exterior laminate layer and interior laminate layer by exposing the multi-layered metal sandwich structure to an anodizing process; and
   removing the mask by cutting away the mask and the third surface of the non-anodizable layer and a portion of the anodizable exterior laminate layer and interior laminate layer.

2. The method of claim 1, wherein the non-anodizable layer is comprised of a stainless steel.

3. The method of claim 1, wherein the non-anodizable layer is more rigid than the anodizable exterior and interior laminate layers.

4. The method of claim 1, wherein the anodizable exterior laminate layer and the anodizable interior laminate layer are each comprised of one or more of aluminum, titanium, niobium and tantalum.

5. The method of claim 1, wherein the anodizable exterior laminate layer has a greater thickness than the anodizable interior laminate layer.

6. The method of claim 1, further comprising:
etching a portion of anodized exterior and interior laminate layers exposing a corresponding portion of the non-anodizable layer.

7. A method of anodizing a selected portion of a housing for an electronic device, the housing including a non-anodizable structure comprised of a non-anodizable material, the method comprising:
binding an anodizable layer to a first surface of the non-anodizable structure;
masking a second surface of the non-anodizable structure with a mask configured to prevent exposure of the second surface to a subsequent anodizing process, wherein the second surface is not bonded to anodizable layer;
anodizing the anodizable layer by exposing the housing to an anodizing process, and
removing the mask by cutting away the mask and the second surface of the non-anodizable structure.

8. The method of claim 7, further comprising:
removing the mask from the second surface of the non-anodizable structure.

9. The method of claim 8, wherein the non-anodizable structure is comprised of a metal.

10. The method of claim 9, wherein the metal is comprised of stainless steel.

11. The method of claim 8, wherein the non-anodizable structure is more rigid than the anodizable layer.

12. The method of claim 8, wherein masking the second surface includes masking at least a portion of the anodizable layer.

13. A method of anodizing a housing for an electronic device, the housing including a non-anodizable structure comprised of a non-anodizable material, the method comprising:
cladding an anodizable layer to a first surface of the non-anodizable structure;
applying a mask on a sacrificial surface of the non-anodizable structure that is not clad to the anodizable layer, wherein the mask is configured to prevent exposure of the sacrificial surface from a subsequent anodizing process;
anodizing the anodizable layer by exposing the housing to the anodizing process; and
removing the mask by cutting away the mask and the sacrificial surface of the non-anodizable structure.

14. The method of claim 13, wherein applying a mask on a sacrificial surface includes creating a substantially water-tight seal covering the sacrificial surface.

15. The method of claim 13, wherein applying a mask on a sacrificial surface includes applying the mask over a portion of the anodizable layer.

16. The method of claim 13, wherein the first surface of the non-anodizable structure includes an interior surface of the non-anodizable structure and an exterior surface of the non-anodizable structure.

17. The method of claim 13, further comprising:
prior to applying the mask, creating a shape of the housing by draw-forming the clad anodizable layer and non-anodizable structure.

18. The method of claim 13, wherein the non-anodizable structure is more rigid than the anodizable layer.

19. The method of claim 13, wherein the non-anodizable structure is comprised of stainless steel.

* * * * *